UNITED STATES PATENT OFFICE.

GEORGE H. MURRAY, OF CHICAGO, ILLINOIS.

FERTILIZING COMPOSITION.

SPECIFICATION forming part of Letters Patent No. 377,084, dated January 31, 1888.

Application filed March 12, 1887. Serial No. 230,697. (No specimens.)

*To all whom it may concern:*

Be it known that I, GEORGE H. MURRAY, a citizen of the United States, residing at Chicago, county of Cook, and State of Illinois, have invented certain new and useful Improvements in Fertilizing Compounds, which are fully set forth in the following specification.

The purpose of this invention is to utilize distillery-slop and animal excrement in the manufacture of a fertilizer, which shall be handled in the form of a dry powder or granular mass in convenient form for application in gardening and farming. I find the two substances — animal excrement from grain-fed animals and distillery-slop — to be substantially equivalents for this purpose, since both are the undigested and indigestible residuum of the grain.

The principal feature of this invention consists in the use of tan-bark—that is to say, bark which has been employed for the purpose of tanning leather—as the principal substance for absorbing the elements of vegetable nutrition and stimulus from the other substances which enter into the compound, said tan-bark being the principal vehicle for carrying the other substances, although doubtless itself containing some elements adapted to stimulate the growth of the plants to which the compound is applied. I employ as the elements of my fertilizer, besides distillery-slop or animal excrement and tan-bark, salt, slaked lime, and potash.

The following description of the mode of preparation will give all the necessary information, and also the relative quantities of the several elements which may or should be used.

I first thoroughly dry and grind the tan-bark to a fine powder, and of that powder I take sixteen parts, by measure, and mix therewith eight parts, by measure, of distillery-slop from which the water has been drained, so that while it is still wet it is not in fluid or semi-fluid condition, but in the condition of moist grain or mash. To this I add three or four parts, by measure, of slaked lime and three or four parts, by measure, of common salt, the coarsest variety being suitable, and about one part, by measure, of potash, it not being found necessary to observe very exact proportions, but the compound being made of about one-half tan-bark, about one-quarter drained distillery-slop or its equivalent—animal excrement—and the remainder, about one-quarter, made up of slaked lime, common salt, and potash. These ingredients I thoroughly mix by stirring, and when thus mixed dry them thoroughly in any customary manner.

I find the compound thus produced to be a very efficient stimulus, and to afford the best nourishment for vegetable growth, and that the tan-bark seems to absorb into itself all that is soluble of the other elements, so that it serves as a perfect vehicle for the application of them as desired. The salt may be omitted, however, without very materially diminishing the effectiveness of the compound as a fertilizer in some soils; but for general use I find it preferable to include that element also, as above described.

The above proportions may be considerably varied without materially affecting the value of the result, particularly among the elements salt, potash, and slaked lime, which together, however, should constitute about one-fourth of the entire quantity by measure.

I claim—

A fertilizer composed of approximately one-half pulverized tan-bark, one-quarter drained distillery-slop or animal excrement, and one-quarter common salt, slaked lime, and potash.

In testimony whereof I have hereunto set my hand, this 8th day of March, A. D. 1887, at Chicago, Illinois, in the presence of two witnesses.

G. H. MURRAY.

Witnesses:
CHAS. S. BURTON,
M. SULLIVAN.